April 9, 1968
W. L. BRUGGEMAN
3,377,028
SELF-SEALING CONNECTOR FOR MULTIAPERTURE NOZZLE
Filed April 5, 1966
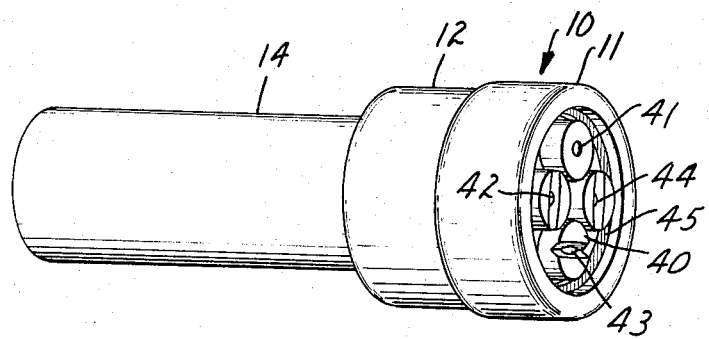
FIG. 1
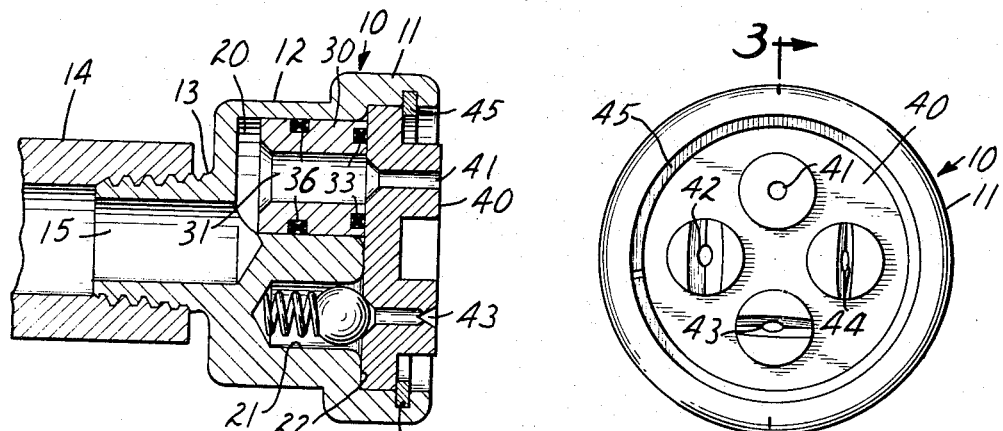
FIG. 3
FIG. 2
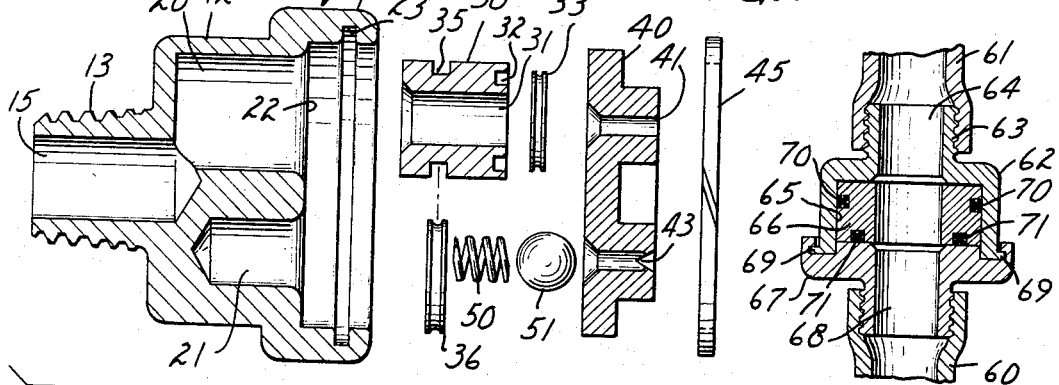
FIG. 4
FIG. 5
INVENTOR.
WILLIAM L. BRUGGEMAN
BY Merchant & Gould
ATTORNEYS United States Patent Office 3,377,028
Patented Apr. 9, 1968

3,377,028
SELF-SEALING CONNECTOR FOR MULTIAPERTURE NOZZLE
William L. Bruggeman, White Bear Lake, Minn., assignor to L & A Products, Inc., St. Paul, Minn.
Filed Apr. 5, 1966, Ser. No. 540,366
2 Claims. (Cl. 239—394)

ABSTRACT OF THE DISCLOSURE

A self-sealing connector which may be utilized to attach a multiaperture nozzle to the end of a conduit including a passage way therethrough with a piston slidably engaged therein and having an opening therethrough approximately equal to the opening of the conduit. The piston further has a sealing ring fitted into the downstream end of the piston approximately concentric with the opening therethrough and a sealing ring around the outer periphery thereof between the walls forming the opening through the connector and the piston. The two sealing rings are disposed to produce a differential pressure on the piston forcing the piston downstream into tight sealing engagement with a rear surface of the nozzle. Because the piston produces a self-sealing effect the nozzle can be connected to the coupling with a simple snap ring or the like.

This invention pertains to a self-sealing connector for conduits having fluid under a relatively high pressure flowing therein and more particularly to a connector having internal apparatus for sealing junctions so that conduits can be connected with quick connect apparatus without leaking.

In the prior art when a fluid under a relatively high pressure is to be conveyed through conduits, the conduits are generally threaded together with resilient gaskets therebetween and leakage can be prevented only by applying a great amount of torque to the threaded parts. Because the various parts must be joined with such great force there is a tendency for the parts to wear and, because the ends of each of the joining parts are butted against opposite sides of the gasket, the gaskets generally last only a very short time. In addition, when a multi-aperture nozzle, such as a turret nozzle or the like, is to be utilized at the end of a conduit carrying a fluid under relatively high pressure a special connection must be utilized which is assembled under great force. To change the nozzle apertures and provide a different spray effect the entire nozzle generally has to be disassembled, rotated slightly and reassembled, thereby expending much time and energy.

The present invention is a novel self-sealing connector one embodiment of which may be utilized to connect two conduits and a second embodiment of which may be utilized to connect a turret nozzle, or the like, to a conduit. The connector includes a housing having an elongated cylindrical opening therethrough, which opening contains a cylindrical piston mounted for limited longitudinal movement. The piston in turn has a longitudinal passage therethrough which passage has one end in communication with a first conduit and the other end in communication with a second conduit or an aperture in a nozzle. One of the conduits or the nozzle provides a surface adjacent one end of the opening in the house which surface is adapted to receive a portion of the piston in abutting relation therewith.

When fluid under pressure is applied to the connector, a differential force is developed across the piston which force urges the piston into abutting relation with the surface described so that the junction of the housing and the conduit, or the housing and the nozzle, is closed and leakage therethrough is prevented. In the embodiment to be described presently two quad rings are positioned in grooves in the piston so that one quad-ring is on either side of the junction of the housing and the nozzle. The two quad-rings offer substantially different surface areas to the pressure within the housing which produces a differential force across the piston forcing the piston tightly against the rear surface of the nozzle, or the quick connect device on the second conduit, and compressing one of the quad-rings therebetween so that no fluid pressure is available at the junction.

Since the piston in the opening of the housing is mounted for limited longitudinal movement the quad-ring at the end thereof is not forced tightly against the surface of the nozzle until such time as fluid under pressure is applied to the connector. Thus, the connector can be assembled with relatively little force and can be disassembled in a similar manner. Also, since there is no force on the nozzle element when the fluid under pressure is not being applied the nozzle element can easily be rotated to align any of the various apertures therein with the passage in the piston. In a similar fashion when the present connector is utilized to join two conduits a simple quick connect apparatus, such as any of the various quarter turn devices presently on the market, can be utilized rather than a threaded device. Another major advantage of the present connector lies in the fact that there is very little wear on the quad-rings or the various parts of the connector since no great force is required in assembling the connector.

It is an object of the present invention to provide a new and improved self-sealing connector.

It is a further object of the present invention to provide a connector for conduits conveying fluid under relatively high pressure, which connector is sealed through the action of the fluid upon the internal parts of the connector rather than through brute force in assembling the connector.

It is a further object of the present invention to provide a connector in which the parts are subject to very little wear due to assembly and disassembly.

It is a further object of the present invention to provide a connector different embodiments of which may be utilized to join two conduits or a conduit and a nozzle element and which connector may utilize the quick connect apparatus to form the junction.

These and other objects of this invention will become apparent to those skilled in the art upon consideration of the accompanying specification, claims, and drawings.

Referring to the drawings, wherein like characters indicate like parts throughout the figures:

FIG. 1 is a view in perspective of the present connector joining a turret nozzle element to a conduit;

FIG. 2 is an enlarged end view as seen from the right in FIG. 1;

FIG. 3 is a sectional view as seen from the line 3—3 in FIG. 2;

FIG. 4 is an exploded sectional view similar to FIG. 3; and

FIG. 5 is a sectional view somewhat diminished in size illustrating an embodiment of the present connector for joining two conduits.

In the figures the numeral 10 designates a housing having a generally cylindrical shape with a series of radially decreasing stepped portions 11, 12 and 13 starting from the right and progressing toward the left. The last stepped portion 13 has a conduit 14 fixedly attached thereto by some convenient means. In the present embodiment the conduit 14 is simply threaded onto the stepped portion 13 of housing 10 to simplify the figures and a further description of this connection will not be made since the type of connection at this point is not critical to the invention. The stepped portion 13 of the housing 10 is hollow and forms a passage 15 therethrough for the flow of water to the stepped portion 12 of housing 10.

The second stepped portion 12 in the housing 10 has an elongated cylindrical opening 20 formed therein. The opening 20 is offset from the center of the housing 10 and lies along a radius of the stepped portion 12 approximately equally spaced from either end thereof. The diameter of the opening 20 is somewhat smaller than a radius of the housing 10 at the stepped portion 12 to leave sufficient sidewalls completely therearound. The fluid passage 15 through the stepped portion 13 extends inwardly past the beginning of the stepped portion 12 a sufficient distance so that there is an overlapping of the passage 15 and the opening 20. This overlapping of the passage 15 and the opening 20 provides fluid communication therebetween. In addition to the opening 20 a second aperture 21 is formed in the stepped portion 12 with its center located approximately 180° from the center of the opening 20. Thus, the centers of the opening 20 and the aperture 21 lie along the same diameter of the step 12 of the housing 10 with the aperture 21 being parallel and spaced from the opening 20. The aperture 21 is elongated and cylindrical in shape but does not extend into the stepped portion 12 sufficiently far to communicate with the passage 15.

The stepped portion 11 of the housing 10 forms a hollow cylindrical wall at the right end of the housing 10 the right end of which is open. The opening 20 and the aperture 21 extend into the stepped portion 11 portion of the housing 10 sufficiently far to be in communication with the opening therein. Thus, fluid is free to flow through the passage 15 the opening 20 and out the right end of the housing 10. Since the stepped portion 12 has a radius somewhat smaller than the stepped portion 11 of the housing 10, a shoulder 22 is formed between the two stepped portions 11 and 12. Spaced from the shoulder 22 a short distance toward the right end of the housing 10 is a groove 23 extending completely around the housing 10 and having an inner radius somewhat larger than the inner radius of the stepped portion 11 of the housing 10.

A cylindrical piston 30 having an outer diameter slightly smaller than the inner diameter of the opening 20 in the stepped portion 12 of the housing 10 is positioned therein as illustrated in FIG. 3. The length of the piston 30 is somewhat shorter than the lengh of the opening 20 so that the piston 30 can move along its longitudinal axis a limited distance. The piston 30 has a fluid passage 31 extending longitudinally therethrough so that one end of the passage 31 is in communication with the passage 15 while the other end of the passage 31 is in communication with the opening in the stepped portion 11 of the housing 10.

A groove 32 is formed in the right end of the piston 30 so as to encircle the passage 31 and be substantially coaxial therewith. The groove 32 has a substantially rectangular shaped cross-section and a depth such that a resilient washer, for example a rubber quad-ring 33, can be positioned therein. When the quad-ring 33 is positioned in the groove 32 it extends outwardly past the end surface of the piston 30 a short distance in a manner well-known to those familiar with the use of O-rings, sealing gaskets, etc.

A second groove 35 in the outer periphery of the piston 30 is spaced from the right end of the piston 30 a substantial distance and has a rectangular shaped cross-section similar to the groove 32. A resilient washer, such as a rubber quad-ring 36 similar to the quad-ring 33, is positioned in the groove 35 and extends outwardly from the outer surface of the piston 30 in a fashion well-known to those skilled in the art. The quad-ring 36 provides a fluid seal between the outer surface of the piston 30 and the inner surface of the opening 20 so that all fluid flowing from the passage 15 into the opening 20 must flow through the passage 31 to reach the opening in the stepped portion 11.

A multi-aperture nozzle element 40 is a substantially disk-shaped element having an outer diameter slightly smaller than the inner diameter of the opening in the stepped portion 11. In this embodiment the multi-aperture nozzle element 40 has four apertures 41–44 which provide four different spray patterns for the fluid passing therethrough. The apertures 41–44 are surrounded by a cylindrical portion which extends outwardly from the outer surface of the disk-shaped portion of the nozzle 40 in a cylindrical fashion to produce a nozzle around each aperture 41–44. The nozzle element 40 is placed in abutting relationship with the shoulder 22 and a snap-ring 45 is positioned in the groove 23. Thus, the nozzle element 40 is rotatably mounted in the housing 10.

A cylindrical compression spring 50 is positioned in the aperture 21 and a ball 51 is positioned between the spring 50 and the inner surface of the nozzle element 40. In the present embodiment the ball 51 is constructed of some relatively smooth, non-abrasive material, such as Teflon or some other hard plastic. When the nozzle element 40 is in the correct position, as illustrated in FIG. 3, the ball 51 compresses the spring 50 a sufficient amount so that a force is applied outwardly against the nozzle element 40. Each of the apertures 41–44 in the nozzle element 40 are flanged outwardly at the rear surface thereof so that the ball 51 nests therein to act as a detent for the nozzle element 40. The aperture 21 and the opening 20 in the housing 10 are positioned with respect to the apertures 41–44 in the nozzle element 40 so that one of the apertures is axially aligned with the passage 31 in the piston 30 when the ball 51 is nested in an aperture 180° therefrom. Thus, the spring 50 and ball 51 act as a detent to correctly align and hold the nozzle element 40 relative to the passage 31 in the piston 30.

With the entire device assembled as illustrated and explained the operation is as follows. Since the piston 30 is freely movable in the opening 20, with no fluid under pressure applied thereto, the nozzle element 40 has no pressure applied thereto, except the detent mechanism spring 50 and ball 51, so that it is free to rotate. Thus, with no dismantling of the device the nozzle element 40 can be rotated by hand so that the desired aperture 41–44 is aligned with the passage 31 in the piston 30. Once the desired aperture has been chosen a fluid under pressure is applied by means of the conduit 14. When the fluid flows into the chamber 20 the piston 30 migrates to the right into abutting relationship with the rear surface of the nozzle element 40. As the fluid fills the passage 15, opening 20 and passage 31 the pressure throughout becomes substantially equal.

As the pressure in the opening 20 equalizes a differential force is developed across the piston 30 because of the different surface areas exposed to the fluid. Because the quad-ring 36 encircles the piston 30 at the outer periphery the entire left end of the piston 30 is subjected to fluid pressure. Also, because the quad-ring 33 is positioned in the right end of the piston 30 and spaced from the outer periphery, the fluid pressure is only present on that portion of the right end of piston 30 enclosed within the quad-ring 33. This occurs because the quad-rings 35 and 33 prevent fluid from flowing around the outer edges of the piston 30. Since the static forces on the piston 30 are equal to the pressure times the area upon which the pressure is acting and since the pressures are approximately equal throughout the opening 20, the force on the piston 30 is approximately equal to the ratio of the area of the left end of the piston 30 to the area of the right end of the piston 30 enclosed within the quad-ring 33. In the present embodiment this ratio is in the neighborhood of four to one and, thus, a relatively large force is produced on the piston 30 urging it toward the inner surface of the nozzle element 40. This force prevents leakage of fluid between the piston 30 and the rear surface of the nozzle element 40 and the quad-ring 36 prevents leakage of fluid between the piston 30 and the surfaces of the opening 20. Thus, leakage of fluid through the junction formed by the nozzle element 40 and the housing 10 is prevented.

In FIG. 5 an embodiment of the present connector is illustrated wherein two conduits 60 and 61 are connected together in fluid communication. In this embodiment a housing 62 has a single radially reduced stepped portion 63 having a fluid passage 64 therethrough. The conduit 61 is fixedly attached to the stepped portion 63 by threading. The shape of the housing 62 is cylindrical and the housing 62 is hollow so that the passage 64 in the stepped portion 63 leads directly into an opening 65. A piston 66 is positioned in the opening 65 in a fashion similar to the method in which piston 30 is positioned in the opening 20 of the previous embodiment.

The second conduit 60 is attached to a quick-connect device 67, by some means such as threading or the like. The quick-connect device 67 consists of a cylindrical housing having a passage 68 therethrough with a diameter approximately equal to the passage 64 in the stepped portion 63 of the housing 62. At the outer surface of the housing 67 a groove is adapted to receive the end of the housing 62 therein. A plurality of flanged portions 69 extend radially outwardly from the ends of the housing 62 and engage slots in the housing 67 when the housing 62 and the housing 67 are joined in the normal manner.

The piston 66 has a groove in the outer periphery in which is positioned a quad-ring 70 and a groove in the end adjacent the housing 67 having a quad-ring 71 therein. Quad-rings 70 and 71 are positioned in a manner similar to the positioning of quad-rings 33 and 36 on piston 30 in the previous embodiment. The piston 66 is nearly as long as the opening 65 in the housing 62 so that the quad-ring 71 fits snugly against the inner surface of the housing 67 when the housing 62 and the housing 67 are properly engaged.

In the embodiment illustrated in FIG. 5 the operation is similar to the operation described in conjunction with the previous embodiment. The upper end of the piston 66 is open and has fluid pressure applied thereto over the entire surface. The lower end of the piston 66 is divided by the quad-ring 71 and has fluid pressure applied only to the inner portion thereof. Thus, a much greater force is developed in a downward direction on a piston 66 than there is developed upwardly. This causes the piston 66 to be urged into close abutting relationship with the inner surface of the housing 67 and leakage of fluid through the junction between the housing 62 and the housing 67 is prevented.

Thus, a connector has been described which is self-sealing in that internal pressures operating on the parts therein force a piston into sealing relationship so that fluid leakage at the junction is prevented. In addition, because the piston is movable along its longitudinal axis and has no forces applied when fluid pressure is removed no great forces are required in the assembly or use of the connector. In the nozzle assembly described in the first embodiment the nozzle can be rotated manually with ease when no fluid pressure is applied thereto. Therefore, no dismantling or disassembling is required to change apertures on the nozzle. In the conduit connector embodiment described in conjunction with FIG. 5 a simple commercially available quick-connect device can be utilized in conjunction with the present invention to couple two conduits whereas in the prior art special couplings were required which were threaded together and required gaskets and the like. In conjunction with FIG. 5 it should be noted that the force on the piston 66 will always be in the same direction regardless of which direction the fluid is flowing through the passages.

While I have shown and described specific embodiments of this invention, further modification and improvements will occur to those skilled in the art. I desire it to be understood therefore, that this invention is not limited to the particular form shown and I intend in the appended claims to cover all modifications which do not depart from the spirit and scope of this invention.

What is claimed is:

1. A self-sealing connector for conduits and the like comprising:
    (a) a housing having an elongated cylindrical opening therethrough;
    (b) a cylindrical piston having an outer periphery substantially similar to the inner periphery of said opening in said housing and having a longitudinal passage therethrough, said piston being somewhat shorter than said opening in said housing and positioned therein for limited longitudinal movement;
    (c) means for connecting a fluid conduit to said housing in fluid communication with one end of said opening in said housing and said passage through said piston;
    (d) multiaperture nozzle means and means rotatably mounting said nozzle means within said housing so that only one aperture is in communication with the passage through said piston at any time and providing an inner surface adjacent the other end of said opening forming a transversely inwardly projecting shoulder within the opening in said housing;
    (e) a first groove in said piston encircling said passage therethrough and having a resilient washer positioned therein; and
    (f) a second groove in said piston encircling said passage therethrough positioned so that the junction of said housing and said fluid conveying apparatus is located between said second groove and said first groove and having a resilient washer positioned therein so that one of said resilient washers lies between said piston and an inner wall of said housing and the other of said resilient washers lies between said piston and said inner surface of said fluid conveying apparatus, said second groove and associated resilient washer being characterized by providing a substantially larger surface area of said piston for fluid pressure to operate upon than said first groove and its associated resilient washer.

2. A self-sealing connector substantially as set forth in claim 1 wherein the multiaperture nozzle is rotatably mounted against a recessed shoulder in the housing and maintained in place by a snap ring fitted into a groove in said housing and spaced from said shoulder.

References Cited

UNITED STATES PATENTS

| 375,547 | 12/1887 | Gibbs | 285—100 |
| 2,129,682 | 9/1938 | Glose | 285—101 |
| 2,132,333 | 10/1938 | Wendell et al. | 239—394 |
| 2,712,458 | 7/1955 | Lipson | 285—101 |
| 3,225,972 | 12/1965 | Brumbach | 239—394 X |
| 3,291,442 | 12/1966 | Cranage | 285—101 X |

FOREIGN PATENTS

| 154,677 | 1/1954 | Australia. |
| 873,808 | 4/1942 | France. |

M. HENSON WOOD, Jr., *Primary Examiner.*

VAN C. WILKS, *Assistant Examiner.*